R. A. SOLER AND J. G. NEGRETE.
APPARATUS FOR CUTTING VEGETABLES.
APPLICATION FILED MAR. 10, 1919.
1,386,970.
Patented Aug. 9, 1921.
2 SHEETS—SHEET 1.
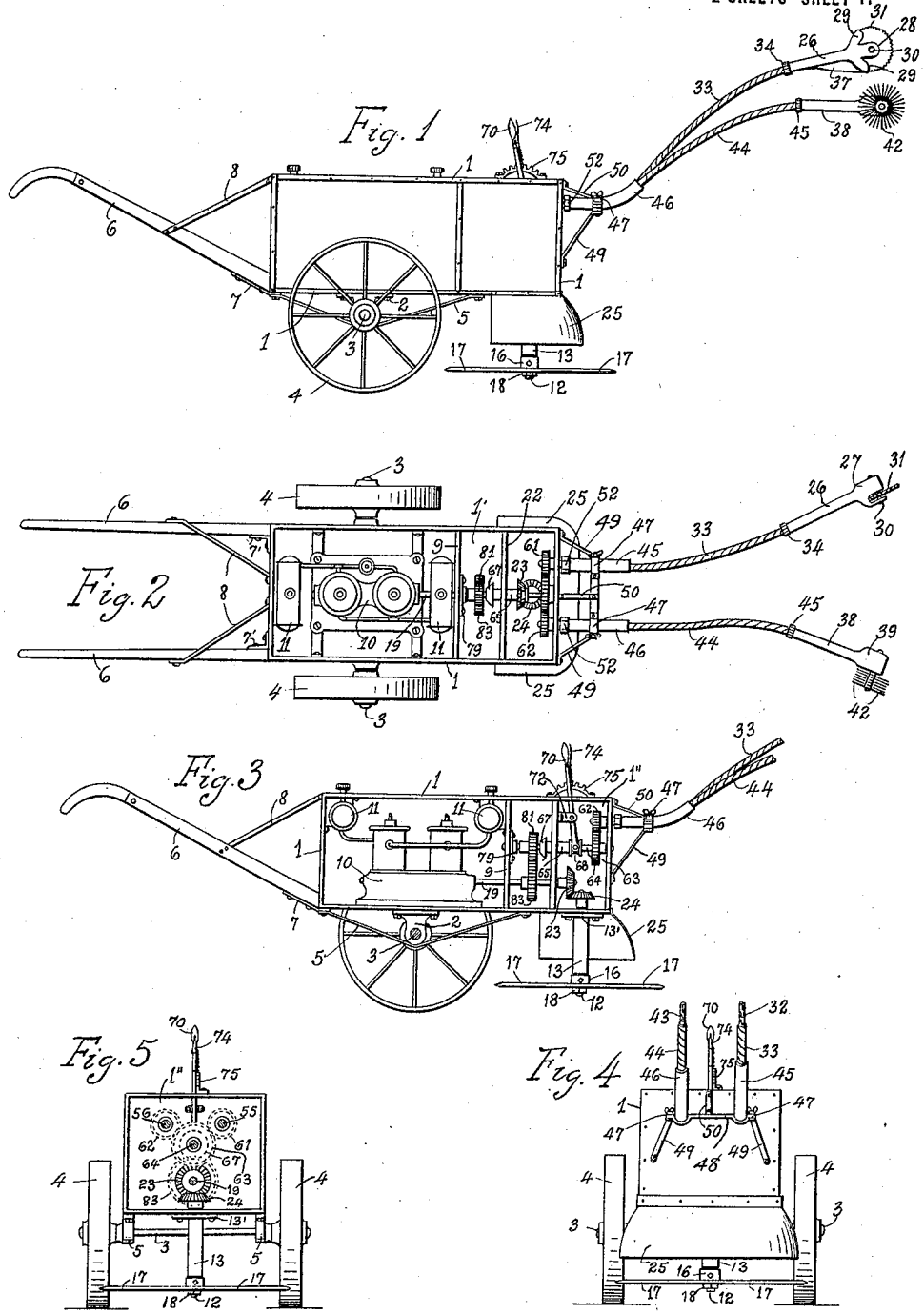

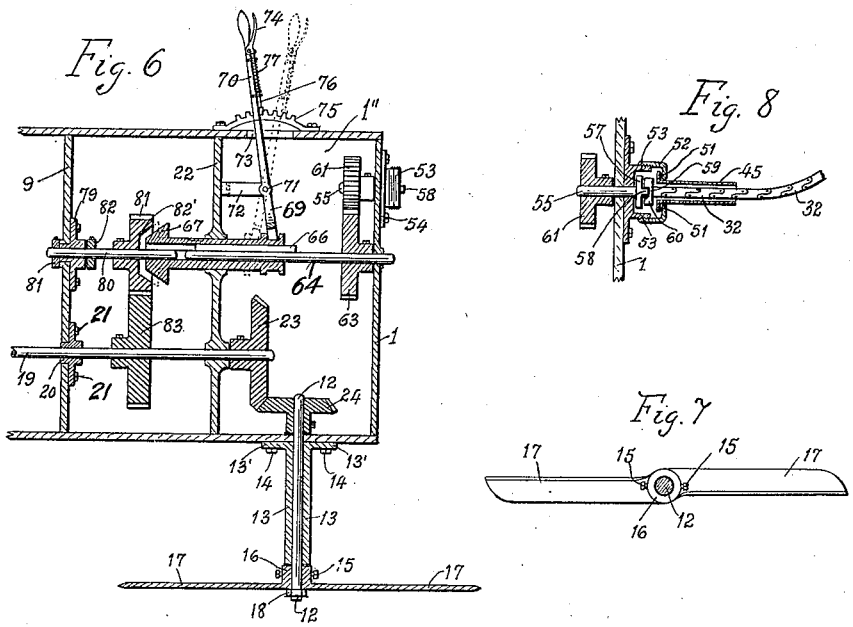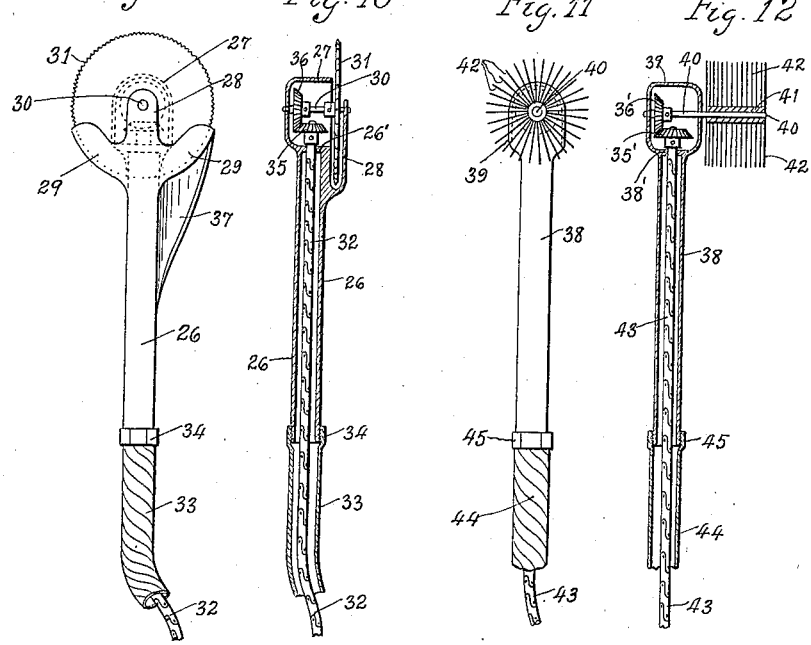

UNITED STATES PATENT OFFICE.

RAFAEL A. SOLER AND JULIO G. NEGRETE, OF HABANA, CUBA.

APPARATUS FOR CUTTING VEGETABLES.

1,386,970.     Specification of Letters Patent.      Patented Aug. 9, 1921.

Application filed March 10, 1919. Serial No. 281,685.

*To all whom it may concern:*

Be it known that we, RAFAEL A. SOLER and JULIO G. NEGRETE, both citizens of the Republic of Cuba, and residents of Habana, Republic of Cuba, have invented certain new and useful Improvements in Apparatus for Cutting Vegetables, of which the following is a specification.

This invention relates to improvements in machines for cutting vegetables, and particularly for cutting canes and grass, and its object is to provide an apparatus of this kind which is especially adapted for cutting the plants close to the ground. Another object is to provide such apparatus with an efficient driving mechanism for the cutter.

Another object of the invention is to effect improvements in the cutting mechanism.

In the accompanying drawings—

Figure 1 is a side elevation of a vegetable cutting machine, constructed in accordance with our invention.

Fig. 2 is a plan of the same with the top of the casing removed.

Fig. 3 is a side elevation with the side cover of the casing removed to show the interior mechanism.

Fig. 4 is a front end elevation of the same.

Fig. 5 is a similar view, with the front wall of the casing removed.

Fig. 6 is a detail vertical longitudinal sectional view of the same.

Fig. 7 is a detail plan of the knives which form the cutters with the shaft shown in action.

Fig. 8 is a detail longitudinal sectional view of the means for connecting one of the flexible shafts and one of the stub shafts, the associated parts.

Fig. 9 is a detail elevation of part of the cutting mechanism and its flexible shaft.

Fig. 10 is a detail sectional view of the same.

Fig. 11 is a detail elevation showing a modified form of cutting mechanism and its flexible shaft.

Fig. 12 is a detail sectional view of the same.

In the embodiment of our invention, we provide a frame in the form of a rectangular casing 1, said frame having bearings 2 on its lower side, and an axle shaft 3 being mounted in said bearings and provided with ground wheels 4. Hence the frame or casing is pivotally mounted so that its front end may be raised or lowered as required.

Handles 6 project rearwardly and upwardly from the rear end of the casing and are secured thereto by suitable angle plates 7—7′. Braces 8 are provided for the handles.

The frame or casing is provided with a transverse vertical partition wall 9, which provides the casing with front and rear chambers. A motor 10, which is here shown as an internal combustion engine, is mounted in the rear chamber. Its fuel tanks are indicated by 11. A vertical cutter shaft 12 is mounted for rotation in a vertical tubular bearing 13, the head of which 13′ is secured by means of bolts 14 to the bottom of the casing at a point near the front end thereof. The screw 15 secures the hub 16 of the cutter 17 to the lower portion of the shaft 12, said cutter being here shown as comprising a pair of diametrically opposed blades. A nut 18 is screwed to the lower end of the shaft 12.

The motor shaft 19 extends forwardly in the front chamber of the casing and is mounted in the bearing 20 which is secured to the partition wall 9 by bolts 21, and also as a bearing in the partition wall 22 which is spaced a suitable distance in front of the partition wall 9. Said motor shaft has a beveled gear 23 secured to its front end and the upper end of the cutter shaft 12 is provided with a beveled gear 24 which is engaged by the gear 23 and hence the said cutter 17 can be rotated by the power of the motor as will be understood. The hood 25 is secured on the front end of the casing and depends therefrom.

We also provide manually manipulated cutters which are operated by an operator who walks in front of the machine and are employed for cutting the canes at any desired point above the ground before they are cut by the cutter 17 at a point immediately above the ground. The bottom of this cutting mechanism includes a tubular handle 26 which has a hood 27 at its front end, said hood being provided with divergent arms 28—29, the latter being guide arms. A shaft 30 is mounted on the arm 28 and on the rear wall of the hood and has a circular saw or knife 31 of similar diameter which projects radially beyond the hood 27 and is arranged in an opening between the arm 28 and the rear side of the hood. A flexible shaft 32 extends through the tubular handle 26 and is provided at its front end with a beveled gear 35 which engages a similar gear 36 on the shaft 30. The said flexible shaft also extends through a flexible protecting hose 33, the front end of which is coupled to the rear end of the tubular handle 26 as at 34.

The tubular handle 26 has at one side a cutting edge extension 37 which leads from one of the arms 29 to said tubular handle and serves as a cutting tool and to assist the action of the circular knife 31.

Another form of cutting mechanism which is especially adapted for use in chaffing off the cane or vegetable stalks at any desired point, and which is held and guided by the hand of the operator, includes a pipe 38, which has at one end a hood or casing 39 in whose front and rear walls a cross shaft 40 is mounted for rotation. Said shaft projects beyond one side of the hood and carries a sleeve 41 which is provided with metal arms 42 which form the chaffing off roller. A flexible shaft 43 extends through the tubular handle 38 and is provided at its front end with a beveled gear 35′ which engages a similar gear 36′ on the shaft 40. Said flexible shaft also extends through a protecting hose 44 which is connected to the rear end of the tubular handle 38 as at 45.

The two flexible shafts 32—43 are connected to the casing 1 by means of the curved pipes 45—46 through which they respectively pass and which curved pipes are rotatably mounted on bearings 47 attached to a supporting plate 48 fixed in front of the casing 1 in brackets 49 and 50 as shown. Each of these curved tubes terminates in an annular flange 51 which serves as a stop thereon and is arranged in a cylindrical casing 52 which is threaded on the cylindrical flange 53 of a bearing 54 which is secured by screws on the front wall of the casing 1. Said bearings 54 support two stub shafts 55 and 56 which pass through openings in the front wall of the casing 1, each of these shafts terminating within the casing 52 in a plate 57 which is provided on the outer side with a tooth 58 which extends thereacross and engages in a corresponding notch 59 of another plate 60 secured to the end of one of the flexible shafts. The stub shaft 55 is provided at its inner end with a beveled pinion 61 and the stub shaft 56 is correspondingly provided with a similar pinion 62. Said pinions 61 and 62 engage a gear 63 which is fixed to a horizontal shaft 64, the front end of which has a bearing in the front wall of the casing 1. The rear end of said shaft is arranged in a sleeve 65 and is provided with a spline 66 which slidably engages in a corresponding longitudinal groove with which said sleeve is provided. Said sleeve is mounted for rotation and longitudinal movement through an opening in the partition wall 22 and has at its rear end a friction cone 67. At the front end of said sleeve is an annular circumferential groove 68 which is engaged by the bifurcated lower arms 69 of a lever 70, said lever being pivotally mounted as at 71 on the bracket 72 which is secured to the wall 22. Said lever projects upwardly through a slot 73 in the top of the casing 1 and has a dog 76 which is held by a spring 77 normally in engagement with one of the teeth of a sector 75 for holding said lever and hence allows said sleeve and its friction cone to be placed at any desired adjustment. A dog releasing lever 74 of usual form is pivotally mounted within the upper end of the lever 70.

A bearing 78 which is secured to the partition 9 as at 79 supports the rear end of a shaft 80 which is in line with a shaft 64 and the front portion of which enters the rear portion of the sleeve 65. A gear 81′ is secured to the shaft 80 and has on its front side a frusto conical recess 82′ adapted to receive the friction cone 67. Gear 81′ engages a gear 83 which is secured on the motor shaft 19.

When the machine is being pushed by an operator who grasps the handles 6 and the motor is in operation and the cone 67 is engaged in the recess 82′ the cutter 17 and also the cutters 31—42 are driven by the motor, the cutter 17 cuts off the canes at a point close above the ground while the second operator who walks in front of the machine and grasps and manipulates the tubular handles 36 and 38, causes the cutters 31—42 to cut or chaff off the canes or vegetable stalks at any desired point above the ground and before said cane or vegetable stalks are cut close to the ground by the cutter 17.

By moving the sleeve 65 by means of the lever 70 to cause the friction cone 67 to disengage the recess 82′ of the gear 81′ the cutters 31—42 move throughout the operation while the cutter 17 continues to be driven by the motor.

What we claim is:

1. In a harvester of the class described, a wheeled frame, a longitudinally arranged driving shaft in said frame, a vertical shaft depending from said frame and provided at its lower end with a cutter, said vertical shaft being geared to said driving shaft, a counter shaft geared to the driving shaft and provided with a gear, means to put said counter shaft in or out of gear, a manually operable member, a revoluble member mounted in said manually operable member, a flexible shaft connected to said revoluble member, a stub shaft mounted for rotation in the frame, means to connect said flexible shaft detachably to said stub shaft, and a gear wheel on said stub shaft and engaged with the gear on the counter shaft.

2. In a harvester of the class described, a wheel frame, motor mechanism on said frame, including a shaft mounted for rotation, said shaft having a coupling member, a flexible shaft having a coupling member detachably engaged by the first named coupling member, a cutter driven by said flexible shaft, a tube through which said flexible shaft extends, said tube being provided with a flange, a casing in which said tube is rotatably mounted, and a fixed member through which said shaft extends, said fixed member being provided with a circular flange to which said casing is detachably secured.

In testimony whereof we affix our signatures.

RAFAEL A. SOLER.
JULIO G. NEGRETE.